(12) United States Patent
Davis et al.

(10) Patent No.: US 6,975,746 B2
(45) Date of Patent: Dec. 13, 2005

(54) INTEGRATING DIGITAL WATERMARKS IN MULTIMEDIA CONTENT

(75) Inventors: Bruce L. Davis, Lake Oswego, OR (US); Tony F. Rodriguez, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 35 days.

(21) Appl. No.: 10/648,105

(22) Filed: Aug. 25, 2003

(65) Prior Publication Data

US 2004/0037449 A1 Feb. 26, 2004

Related U.S. Application Data

(63) Continuation of application No. 09/525,865, filed on Mar. 15, 2000, now Pat. No. 6,611,607, and a continuation-in-part of application No. 09/503,881, filed on Feb. 14, 2000, now Pat. No. 6,614,914, and a continuation-in-part of application No. 09/186,962, filed on Nov. 5, 1998, which is a continuation of application No. 08/649,419, filed on May 16, 1996, now Pat. No. 5,862,260, which is a continuation-in-part of application No. 08/508,083, filed on Jul. 27, 1995, now Pat. No. 5,841,978, and a continuation-in-part of application No. 08/436,098, filed on May 8, 1995, now Pat. No. 5,636,292, which is a continuation-in-part of application No. 08/327,426, filed on Oct. 21, 1994, now Pat. No. 5,768,426, and a continuation-in-part of application No. 08/215,289, filed on Mar. 17, 1994, now abandoned, and a continuation-in-part of application No. 08/154,866, filed on Nov. 18, 1993, now abandoned.

(60) Provisional application No. 60/180,364, filed on Feb. 4, 2000.

(51) Int. Cl.$^7$ ................................................ H04K 1/00
(52) U.S. Cl. .................................................... 382/100
(58) Field of Search .................. 382/100; 380/200–203, 380/210, 216, 231, 252, 287, 51, 54; 348/473, 474, 460; 370/527, 528, 529; 381/73.1; 235/494; 386/94; 704/270; 705/44; 713/176, 200, 201; 358/3.28

(56) References Cited

U.S. PATENT DOCUMENTS

| 2,630,525 A | 3/1953 | Tomberlin et al. |
| 3,493,674 A | 2/1970 | Houghton |

(Continued)

FOREIGN PATENT DOCUMENTS

| DE | 2943436 | 5/1981 |
| DE | 3806411 | 9/1989 |
| DE | 3806414 | 9/1989 |
| EP | 058 482 | 8/1982 |

(Continued)

OTHER PUBLICATIONS

Cox et al., "Secure Spread Spectrum Watermarking for Images, Audio and Video", Proc. IEEE Soutcon 96, Jun. 1996, pp. 243–246.*

(Continued)

*Primary Examiner*—Jose L. Couso
(74) *Attorney, Agent, or Firm*—Digimarc Corporation

(57) ABSTRACT

A method for decoding auxiliary data from media signals in multimedia content decodes watermarks from different media signals and uses the watermarks to control processing of the multimedia content. A copy control method decodes a watermark from one of the media signals in multimedia content, and uses the watermark to control processing of the multimedia content. Another method uses a watermark decoded from a first media signal to decode a second media signal. Yet another method uses a watermark decoded from a media signal to decode metadata associated with the media signal. Finally, another method forms a key for decoding data from at least first and second watermarks extracted from first and second media signals.

16 Claims, 3 Drawing Sheets

U.S. PATENT DOCUMENTS

| | | |
|---|---|---|
| 3,562,420 A | 2/1971 | Thompson |
| 3,569,619 A | 3/1971 | Simjian |
| 3,585,290 A | 6/1971 | Sanford |
| 3,665,162 A | 5/1972 | Yamamoto et al. |
| 3,703,628 A | 11/1972 | Philipson, Jr. |
| 3,805,238 A | 4/1974 | Rothfjell |
| 3,809,806 A | 5/1974 | Walker et al. |
| 3,838,444 A | 9/1974 | Louglin et al. |
| 3,845,391 A | 10/1974 | Crosby |
| 3,914,877 A | 10/1975 | Hines |
| 3,922,074 A | 11/1975 | Ikegami et al. |
| 3,971,917 A | 7/1976 | Maddox et al. |
| 3,982,064 A | 9/1976 | Barnaby |
| 3,984,624 A | 10/1976 | Waggener |
| 4,025,851 A | 5/1977 | Haselwood et al. |
| 4,225,967 A | 9/1980 | Miwa et al. |
| 4,230,990 A | 10/1980 | Lert, Jr. et al. |
| 4,231,113 A | 10/1980 | Blasbalg |
| 4,237,484 A | 12/1980 | Brown et al. |
| 4,238,849 A | 12/1980 | Gassmann |
| 4,252,995 A | 2/1981 | Schmidt et al. |
| 4,262,329 A | 4/1981 | Bright et al. |
| 4,313,197 A | 1/1982 | Maxemchuk |
| 4,333,113 A | 6/1982 | Kalinowski |
| 4,367,488 A | 1/1983 | Leventer et al. |
| 4,379,947 A | 4/1983 | Warner |
| 4,380,027 A | 4/1983 | Leventer et al. |
| 4,389,671 A * | 6/1983 | Posner et al. ............... 380/235 |
| 4,395,600 A | 7/1983 | Lundy et al. |
| 4,423,415 A | 12/1983 | Goldman |
| 4,425,642 A | 1/1984 | Moses et al. |
| 4,425,661 A | 1/1984 | Moses et al. |
| 4,476,468 A | 10/1984 | Goldman |
| 4,495,620 A | 1/1985 | Steele et al. |
| 4,528,588 A | 7/1985 | Lofberg |
| 4,532,508 A | 7/1985 | Ruell |
| 4,547,804 A | 10/1985 | Greenberg |
| 4,553,261 A | 11/1985 | Froessl |
| 4,590,366 A | 5/1986 | Rothfjell |
| 4,595,950 A | 6/1986 | Lofberg |
| 4,637,051 A | 1/1987 | Clark |
| 4,639,779 A | 1/1987 | Greenberg |
| 4,644,582 A | 2/1987 | Morishita et al. |
| 4,647,974 A | 3/1987 | Butler et al. |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | D'Aggraives et al. |
| 4,677,466 A | 6/1987 | Lert, Jr. et al. |
| 4,682,794 A | 7/1987 | Margolin |
| 4,697,209 A | 9/1987 | Kiewit et al. |
| 4,703,476 A | 10/1987 | Howard |
| 4,712,103 A | 12/1987 | Gotanda |
| 4,718,106 A | 1/1988 | Weinblatt |
| 4,739,377 A | 4/1988 | Allen |
| 4,750,173 A | 6/1988 | Bluthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. |
| 4,884,139 A | 11/1989 | Pommier |
| 4,885,632 A | 12/1989 | Mabey et al. |
| 4,903,301 A | 2/1990 | Kondo et al. |
| 4,908,836 A | 3/1990 | Rushforth et al. |
| 4,908,873 A | 3/1990 | Philibert et al. |
| 4,920,503 A | 4/1990 | Cook |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,993,068 A | 2/1991 | Piosenka |
| 4,996,530 A | 2/1991 | Hilton |
| 5,010,405 A | 4/1991 | Schreiber et al. |
| 5,027,401 A | 6/1991 | Soltesz |
| 5,036,513 A | 7/1991 | Greenblatt |
| 5,063,446 A | 11/1991 | Gibson |
| 5,073,899 A | 12/1991 | Collier et al. |
| 5,075,773 A | 12/1991 | Pullen et al. |
| 5,077,608 A | 12/1991 | Dubner |
| 5,077,795 A | 12/1991 | Rourke et al. |
| 5,079,648 A | 1/1992 | Maufe |
| 5,083,224 A | 1/1992 | Hoogendoorn et al. |
| 5,083,310 A | 1/1992 | Drory |
| 5,086,469 A | 2/1992 | Gupta et al. |
| 5,091,966 A | 2/1992 | Bloomberg et al. |
| 5,095,196 A | 3/1992 | Miyata |
| 5,103,459 A | 4/1992 | Gilhousen et al. |
| 5,113,437 A | 5/1992 | Best et al. |
| 5,128,525 A | 7/1992 | Stearns et al. |
| 5,134,496 A | 7/1992 | Schwab et al. |
| 5,144,660 A | 9/1992 | Rose |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,147 A | 12/1992 | Bloomberg |
| 5,181,786 A | 1/1993 | Hujink |
| 5,185,736 A | 2/1993 | Tyrrell et al. |
| 5,199,081 A | 3/1993 | Saito et al. |
| 5,200,822 A | 4/1993 | Bronfin et al. |
| 5,212,551 A | 5/1993 | Conanan |
| 5,213,337 A | 5/1993 | Sherman |
| 5,228,056 A | 7/1993 | Schilling |
| 5,243,423 A | 9/1993 | DeJean et al. |
| 5,245,165 A | 9/1993 | Zhang |
| 5,245,329 A | 9/1993 | Gokcebay |
| 5,247,364 A | 9/1993 | Banker et al. |
| 5,253,078 A | 10/1993 | Balkanski et al. |
| 5,257,119 A | 10/1993 | Funada et al. |
| 5,258,998 A | 11/1993 | Koide |
| 5,259,025 A | 11/1993 | Monroe et al. |
| 5,267,334 A | 11/1993 | Normille et al. |
| 5,278,400 A | 1/1994 | Appel |
| 5,280,537 A | 1/1994 | Sugiyama et al. |
| 5,293,399 A | 3/1994 | Hefti |
| 5,295,203 A | 3/1994 | Krause et al. |

| Patent | Date | Inventor |
|---|---|---|
| 5,299,019 A | 3/1994 | Pack et al. |
| 5,305,400 A | 4/1994 | Butera |
| 5,315,098 A | 5/1994 | Tow |
| 5,315,448 A | 5/1994 | Ryan |
| 5,319,453 A | 6/1994 | Copriviza et al. |
| 5,319,724 A | 6/1994 | Blonstein et al. |
| 5,319,735 A | 6/1994 | Preuss et al. |
| 5,325,167 A | 6/1994 | Melen |
| 5,327,237 A | 7/1994 | Gerdes et al. |
| 5,337,361 A | 8/1994 | Wang et al. |
| 5,337,362 A | 8/1994 | Gormish et al. |
| 5,349,655 A | 9/1994 | Mann |
| 5,351,302 A | 9/1994 | Leighton et al. |
| 5,374,976 A | 12/1994 | Spannenburg |
| 5,379,345 A | 1/1995 | Greenberg |
| 5,387,941 A | 2/1995 | Montgomery et al. |
| 5,396,559 A | 3/1995 | McGrew |
| 5,398,283 A | 3/1995 | Virga |
| 5,404,160 A | 4/1995 | Schober et al. |
| 5,404,377 A | 4/1995 | Moses |
| 5,408,542 A | 4/1995 | Callahan |
| 5,410,598 A | 4/1995 | Shear |
| 5,418,853 A | 5/1995 | Kanota et al. |
| 5,422,963 A | 6/1995 | Chen et al. |
| 5,422,995 A | 6/1995 | Aoki et al. |
| 5,425,100 A | 6/1995 | Thomas et al. |
| 5,428,606 A | 6/1995 | Moskowitz |
| 5,428,607 A | 6/1995 | Hiller et al. |
| 5,432,542 A | 7/1995 | Thibadeau et al. |
| 5,432,870 A | 7/1995 | Schwartz |
| 5,436,653 A | 7/1995 | Ellis et al. |
| 5,444,779 A | 8/1995 | Daniele |
| 5,446,273 A | 8/1995 | Leslie |
| 5,449,895 A | 9/1995 | Hecht et al. |
| 5,450,122 A | 9/1995 | Keene |
| 5,450,490 A | 9/1995 | Jensen et al. |
| 5,453,968 A | 9/1995 | Veldhuis et al. |
| 5,461,426 A | 10/1995 | Limberg et al. |
| 5,469,506 A | 11/1995 | Berson et al. |
| 5,473,631 A | 12/1995 | Moses |
| 5,479,168 A | 12/1995 | Johnson et al. |
| 5,481,294 A | 1/1996 | Thomas et al. |
| 5,488,664 A | 1/1996 | Shamir |
| 5,493,677 A * | 2/1996 | Balogh et al. ............ 707/104.1 |
| 5,499,294 A | 3/1996 | Friedman |
| 5,500,856 A | 3/1996 | Nagase et al. |
| 5,510,900 A | 4/1996 | Shirochi et al. |
| 5,513,011 A | 4/1996 | Matsumoto et al. |
| 5,513,260 A | 4/1996 | Ryan |
| 5,515,081 A | 5/1996 | Vasilik |
| 5,521,372 A | 5/1996 | Hecht et al. |
| 5,524,933 A | 6/1996 | Kunt et al. |
| 5,526,427 A | 6/1996 | Thomas et al. |
| 5,530,751 A | 6/1996 | Morris |
| 5,530,759 A | 6/1996 | Braudaway et al. |
| 5,530,852 A | 6/1996 | Meske, Jr. et al. |
| 5,532,920 A | 7/1996 | Hartrick et al. |
| 5,537,216 A | 7/1996 | Yamashita et al. |
| 5,537,223 A | 7/1996 | Curry |
| 5,539,471 A | 7/1996 | Myhrvold et al. |
| 5,541,662 A | 7/1996 | Adams et al. |
| 5,541,741 A | 7/1996 | Suzuki |
| 5,544,255 A | 8/1996 | Smithies et al. |
| 5,548,646 A | 8/1996 | Aziz et al. |
| 5,557,333 A | 9/1996 | Jungo et al. |
| 5,559,559 A | 9/1996 | Jungo et al. |
| 5,568,179 A | 10/1996 | Diehl et al. |
| 5,568,268 A | 10/1996 | Tsuji et al. |
| 5,568,570 A | 10/1996 | Rabbani |
| 5,572,010 A | 11/1996 | Petrie |
| 5,572,247 A | 11/1996 | Montgomery et al. |
| 5,574,787 A | 11/1996 | Ryan |
| 5,576,532 A | 11/1996 | Hecht |
| 5,579,124 A | 11/1996 | Aijala et al. |
| 5,581,800 A | 12/1996 | Fardeau et al. |
| 5,582,103 A | 12/1996 | Tanaka et al. |
| 5,587,743 A | 12/1996 | Montgomery et al. |
| 5,590,197 A | 12/1996 | Chen et al. |
| 5,602,920 A | 2/1997 | Bestler et al. |
| 5,606,609 A | 2/1997 | Houser et al. |
| 5,611,575 A | 3/1997 | Petrie |
| 5,612,943 A | 3/1997 | Moses et al. |
| 5,613,004 A * | 3/1997 | Cooperman et al. ......... 380/28 |
| 5,613,012 A | 3/1997 | Hoffman et al. |
| 5,614,940 A | 3/1997 | Cobbley et al. |
| 5,617,148 A | 4/1997 | Montgomery |
| 5,627,655 A | 5/1997 | Okamoto et al. |
| 5,629,770 A | 5/1997 | Brassil |
| 5,629,980 A | 5/1997 | Stefik et al. |
| 5,636,292 A | 6/1997 | Rhoads |
| 5,638,443 A | 6/1997 | Stefik et al. |
| 5,638,446 A | 6/1997 | Rubin |
| 5,646,997 A | 7/1997 | Barton |
| 5,647,017 A | 7/1997 | Smithies et al. |
| 5,649,054 A | 7/1997 | Oomen et al. |
| 5,652,626 A | 7/1997 | Kawakami et al. |
| 5,659,613 A | 8/1997 | Copeland et al. |
| 5,659,726 A | 8/1997 | Sandford, II et al. |
| 5,659,732 A | 8/1997 | Kirsch |
| 5,661,574 A | 8/1997 | Kawana |
| 5,663,766 A | 9/1997 | Sizer, II |
| 5,664,018 A | 9/1997 | Leighton |
| 5,666,487 A | 9/1997 | Goodman et al. |
| 5,671,277 A | 9/1997 | Ikenoue et al. |
| 5,680,223 A | 10/1997 | Cooper et al. |
| 5,687,191 A | 11/1997 | Lee et al. |
| 5,687,236 A * | 11/1997 | Moskowitz et al. ......... 380/28 |
| 5,689,587 A | 11/1997 | Bender et al. |
| 5,689,623 A | 11/1997 | Pinard |
| 5,709,932 A | 1/1998 | Glez et al. |
| 5,712,920 A | 1/1998 | Spille |
| 5,719,937 A | 2/1998 | Warren et al. |
| 5,719,984 A | 2/1998 | Yamagata et al. |
| 5,721,788 A * | 2/1998 | Powell et al. ............... 382/100 |
| 5,727,092 A | 3/1998 | Sandford, II et al. |
| 5,737,025 A | 4/1998 | Dougherty et al. |
| 5,737,026 A | 4/1998 | Lu et al. |
| 5,739,864 A | 4/1998 | Copeland |
| 5,745,569 A * | 4/1998 | Moskowitz et al. .......... 705/58 |
| 5,761,686 A | 6/1998 | Bloomberg |
| 5,764,763 A | 6/1998 | Jensen et al. |
| 5,764,770 A | 6/1998 | Schipper et al. |
| 5,765,152 A * | 6/1998 | Erickson ....................... 707/9 |
| 5,774,452 A | 6/1998 | Wolosewicz |
| 5,778,102 A | 7/1998 | Sandford, II et al. |
| 5,799,081 A | 8/1998 | Kim et al. |
| 5,799,082 A | 8/1998 | Murphy et al. |
| 5,819,289 A | 10/1998 | Sanford, II et al. |
| 5,822,360 A | 10/1998 | Lee et al. |
| 5,822,432 A * | 10/1998 | Moskowitz et al. ......... 380/28 |
| 5,826,227 A | 10/1998 | Jayant |
| 5,828,325 A | 10/1998 | Wolosewicz et al. |
| 5,835,639 A | 11/1998 | Honsinger et al. |
| 5,850,249 A | 12/1998 | Massetti et al. |
| 5,857,038 A | 1/1999 | Owada et al. |
| 5,859,920 A | 1/1999 | Daly et al. |
| 5,862,218 A | 1/1999 | Steinberg |
| 5,862,260 A | 1/1999 | Rhoads |
| 5,878,010 A | 3/1999 | Okamoto et al. |
| 5,889,868 A * | 3/1999 | Moskowitz et al. ........ 713/176 |
| 5,893,067 A | 4/1999 | Bender et al. |
| 5,905,505 A | 5/1999 | Lesk |

| | | | |
|---|---|---|---|
| 5,905,819 A | 5/1999 | Daly | |
| 5,907,443 A | 5/1999 | Hirata | |
| 5,929,920 A | 7/1999 | Sizer, II | |
| 5,930,369 A | 7/1999 | Cox et al. | |
| 5,937,000 A | 8/1999 | Lee et al. | |
| 5,940,135 A * | 8/1999 | Petrovic et al. | 348/473 |
| 5,940,429 A | 8/1999 | Lam et al. | |
| 5,943,422 A | 8/1999 | Van Wie et al. | |
| 5,945,932 A | 8/1999 | Smith et al. | |
| 5,960,151 A | 9/1999 | Takahashi | |
| 5,970,140 A | 10/1999 | Sandford, II et al. | |
| 5,982,977 A | 11/1999 | Naruse et al. | |
| 5,987,127 A * | 11/1999 | Ikenoue et al. | 358/401 |
| 5,987,459 A | 11/1999 | Swanson et al. | |
| 5,991,500 A | 11/1999 | Kanota et al. | |
| 6,000,621 A | 12/1999 | Hecht et al. | |
| 6,031,914 A | 2/2000 | Tewfik et al. | |
| 6,035,177 A | 3/2000 | Moses et al. | |
| 6,044,156 A | 3/2000 | Honsinger et al. | |
| 6,061,793 A | 5/2000 | Tewfik et al. | |
| 6,078,664 A | 6/2000 | Moskowitz et al. | |
| 6,086,706 A | 7/2000 | Brassil et al. | |
| 6,151,076 A | 11/2000 | Hoffman et al. | |
| 6,181,802 B1 | 1/2001 | Todd | |
| 6,209,094 B1 | 3/2001 | Levine et al. | |
| 6,211,919 B1 | 4/2001 | Zink et al. | |
| 6,219,634 B1 | 4/2001 | Levine | |
| 6,233,347 B1 | 5/2001 | Chen et al. | |
| 6,233,684 B1 | 5/2001 | Stefik et al. | |
| 6,266,299 B1 | 7/2001 | Oshima et al. | |
| 6,282,654 B1 | 8/2001 | Ikeda et al. | |
| 6,353,672 B1 | 3/2002 | Rhoads | |
| 6,442,285 B2 | 8/2002 | Rhoads et al. | |
| 6,611,607 B1 * | 8/2003 | Davis et al. | 382/100 |
| 2001/0032312 A1 | 10/2001 | Runje et al. | |

FOREIGN PATENT DOCUMENTS

| | | |
|---|---|---|
| EP | 366 381 | 5/1990 |
| EP | 372 601 | 6/1990 |
| EP | 493 091 | 12/1990 |
| EP | 411 232 | 2/1991 |
| EP | 418 964 | 3/1991 |
| EP | 441 702 | 8/1991 |
| EP | 0565947 | 10/1993 |
| EP | 551 016 | 2/1994 |
| EP | 581 317 | 2/1994 |
| EP | 605 208 | 7/1994 |
| EP | 629 972 | 12/1994 |
| EP | 642 060 | 3/1995 |
| EP | 649 074 | 4/1995 |
| EP | 650 146 | 4/1995 |
| EP | 651 554 | 5/1995 |
| EP | 705 025 | 4/1996 |
| EP | 0618723 | 5/2001 |
| GB | 2063018 | 5/1981 |
| GB | 2067871 | 7/1981 |
| GB | 2104701 | 3/1983 |
| GB | 2196167 | 4/1988 |
| GB | 2204984 | 11/1988 |
| JP | 4-248771 | 9/1992 |
| JP | 05/242217 | 9/1993 |
| JP | 8-30759 | 2/1996 |
| WO | WO89/08915 | 9/1989 |
| WO | WO92/19073 | 10/1992 |
| WO | WO93/25038 | 12/1993 |
| WO | WO95/10835 | 4/1995 |
| WO | WO95/14289 | 5/1995 |
| WO | WO95/02091 | 7/1995 |
| WO | WO96/21290 | 7/1996 |
| WO | WO96/26494 | 8/1996 |
| WO | WO96/27259 | 9/1996 |
| WO | WO9731440 | 8/1997 |
| WO | WO 97/33392 | 9/1997 |
| WO | WO9746012 | 12/1997 |
| WO | WO 98/53565 | 11/1998 |
| WO | WO 00/00969 | 1/2000 |
| WO | WO 00/22745 | 4/2000 |
| WO | WO 02/03385 | 1/2002 |

OTHER PUBLICATIONS

Zhao, Jian, "A WWW Service to Embed and Prove Digital Copyright Watermarks", Proc. of the European Conference on Multimedia, Services and Techniques, pp. 1–115, May 1996.*

Szepanski, Wofram, "Compatibility Problems in add–on Data Transmission for TV–Channels", 2nd Symp and Tech Exh. on Electromagnetic Compatibility, Jun. 28, 1977, pp. 263–268.*

Proceedings. Technological Strategies for Protecting Intellectual Property in the Networked Multimedia Environment, vol. 1 Issue 1, Jan. 1994, pp. 1–265.

Cox et al., Secure Spread Spectrum Watermarking for Images, Audio and Video. Proc. IEEE Southcon 96, Jun. 1996, pp. 243–246.

Zhao, Jian, "A WWW Service to Embed and Prove Digital Copyright Watermarks", Proc. of the European Conference on Multimedia, Sevices and Techniques, pp. 1–15, May 1996.

Bender, et al., "Applications for Data Hiding," IBM Systems Journal, vol. 39, No. 384, 2000, pp. 547–568.

Dittmann et al., "Content–Based Digital Signature for Motion Pictures Authentication and Content–Fragile Watermarking," 1999 IEEE, pp. 209–213.

Dittmann et al., "Media–Independent Watermarking Classification and the Need for Combining Digital Video and Audio Watermarking for Media Authentication," 2000 IEEE, pp. 62–67.

Ten Kate W.R., et al., "A New Surround–Stereo–Surround Coding Technique", Phillips Research Laboratories, The Netherlands, May, 1992.

Gerzon, et al., "A High–Rate Buried–Data Channel for Audio CD," presented at the 94.sup.th convention of the Audio Engineering Society, Mar. 16–19, 1993.

"Access Control and Copyright Protection for Images, Conditional Access and Copyright Protection Based on the Use of Trusted Third Parties," 1995, 43 pages.

"Access Control and Copyright Protection for Images, WorkPackage 8: Watermarking," Jun. 30, 1995, 46 pages.

"Access Control and Copyright Protection for Images, WorkPackage 3: Evaluation of Existing Systems," Apr. 19, 1995, 68 pages.

"Access Control and Copyright Protection for Images, WorkPackage 1: Access Control and Copyright Protection for Images Need Evaluation," Jun. 1995, 21 pages.

"Copyright Proctection for Digital Images, Digital Fingerprinting from FBI," Highwater FBI brochure, 1995, 4 pages.

"Cyphertech Systems: Introduces Digital Encoding Device to Prevent TV Piracy," Hollywood Reporter, Oct. 20, 1993, p. 23.

"Foiling Card Forgers With Magnetic Noise,", Wall Street Journal, Feb. 8, 1994.

Frequently Asked Questions About Digimarc Signature Technology, Aug. 1, 1995, http://www.digimarc.com, 9 pages.

"High Water FBI Limited Presentation Image Copyright Protection Software," FBI Ltd brochure, Jul., 1995, 17 pages.

"Holographic signatures for digital images," The Seybold Report on Desktop Publishing, Aug. 1995, one page.

"NAB—Cyphertech Starts Anti–Piracy Broadcast Tests," Newsbytes, New03230023, Mar. 23, 1994.

"Steganography," Intellectual Property and the National Information Infrastructure The Report of the Working Group on Intellectual Property Rights, Sep. 1995, pp. 212–213.

"The Copyright Can of Worms Opened Up By The New Electronic Media," Computergram Internations, pCGN07170006, Jul. 17, 1995, 3 pages total.

"Watermarking & Digital Signature: Protect Your Work!" Published on Internet 1996, http://Itswww.epfl.ch/jordan/watermarking.html.

"Access Control and Copyright Protection of Images, Conditional Access and Copyright Protection Based on the Use of Trusted Third Parties, " 1995, 43 pages.

Anderson, "Stretching the Limits of Steganography," Information Hiding, First International Workshop Proc., May 30–Jun. 1, 1996, pp. 39–48.

Arachelian, "White Noise Storm," Apr. 11, 1994, Internet reference, 13 pages.

Arazi, et al., "Intuition, Perception, and Secure Communications," IEEE Transactionson Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communication," Helskinki University of Technology, Digital Systems Laboratory, Nov. 5, 1995, 13 pages.

Aura, "Practical Invisibility in Digital Communication," Information Hiding, First Int. Workshop Proc. May 30–Jun. 1, 1996, pp. 265–278.

Barlett, et al., "An Overview of HighWater FBI Technology," Posted on Internet Mar. 22, 1996, 12 pages.

Bender et al., "Techniques for Data Hiding," Draft Preprint, Private Correspondence, dated Oct. 30, 1995, 45 pages.

Bender et al., "Techniques for Data Hiding," Masschusetts Institute of Technology, Media Laboratory, Draft Preprint, Apr. 13, 1995, 10 pages.

Bender, Techniques for Data Hiding, Proc. SPIE, vol. 2420, Feb. 9, 1995, pp. 164–173.

Boland et al., "Watermarking Digital Images for Copyright Protection," Fifth International Conference on Image Processing and its Applications, Conference Date Jul. 4–6, 1995, Conf. Publ. No. 410, p. 326–330.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96, 1996 IEEE, pp. 473–480.

Bors et al., "Embedding Parametric Digital Signatures in Images," EUSIPCO–96, Trieste, Italy, accepted for publication, Sep. 1996 (Published on internet Apr. 9, 1996, (http://poseidon.csd.auth.gr/papers/confers:1_ind.html)), 4 pages.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.

Brandt et al., "Representations that Uniquely Characterize Images Modulo Translation, Rotation, and Scaling," Pattern Recognition Letters, Aug. 1, 1996, pp. 1001–1015.

Brassil et al., Electronic Marking and Identification Techniques to Discourage Document Copying, Proceedings of INFOCOM '94 Conference on Computer, IEEE Commun. Soc Conference, Jun. 12–16, 1994, pp. 1278–1287.

Brassil et al., "Hiding Information in Document Images," Nov., 1995, 7 pages.

Braudaway et al., "Protecting Publicly–Available Images with a Visible Image Watermark," SPIE vol. 2659, Feb. 1, 1996, pp. 126–133.

Brown, "S–Tools for Windows, Version 1.00; What is Steganography," Internet reference, Mar. 6, 1994, 6 pages.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

Bruyndonckx et al., Neural Network Post–Processing of Coded Images Using Perceptual Masking, 1994, 3 pages.

Bruyndonckx et al., "Spatial Method for Copyright Labeling of Digital Images," 1994, 6 pages.

Burgett et al., "A Novel Method for Copyright Labeling Digitized Image Data," requested by e–mail from author (unavailable/password protected on IGD WWW site); 12 pages.

Caronni, "Assuring Ownership Rights for Digital Images," Published in the Proceedings of 'Reliable IT Systems,' VIS '95, HH. Bruggerman and W. Gerhardt–Hackl (Ed.), Viewing Publishing Company, Germany, 1995, Jun. 14, 1994, 10 pages. (Originally published as an ETH (Zurich) Technical Report, "Ermitteln Unauthorisierter Verteiler von Maschinenlesbaren Daten," Aug. 1993.

Caruso, "Digital Commerce, 2 plans for watermarks, which can bind proof of authorship to electronic works." New York Times, Aug. 7, 1995, one page.

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Cha et al., "A Solution to the On–Line Image Downgrading Problem," Proc. 11.sup.th Annual Computer Security Applications Conf., Dec. 11, 1995, pp. 108–112.

Cheong, "Internet Agent, Spiders, Wanderers, Brokers, and Bots," New Publising, Indianapolis, IN, 1996, 413 pages.

Choudhury, et al., "Copyright Protection for Electronic Publishing over Computer Networks," IEEE Network Magazine, Jun. 1994, 18 pages.

Chudy, "Handcuff Digital Thieves," Byte Magazine, Apr., 1996, 4 pages.

Clarke, "Invisible Code Tags Electronic Images," Electronic Engineering Times, Jun. 12, 1995, n. 852, p. 42.

Cox et al., "A Secure, Imperceptable Yet Perceptually Salient, Spread Spectrum Watermark for Multimedia," IEEE, Southcon/96, Conference Record, pp. 192–197, 1996.

Cox et al., "Secure Spread Spectrum Watermarking for Multimedia," NEC Research Institute Technical Report, Dec. 5, 1995, 33 pages.

* cited by examiner

INTEGRATING DIGITAL WATERMARKS IN MULTIMEDIA CONTENT

RELATED APPLICATION DATA

This patent application is a continuation of application Ser. No. 09/525,865, filed Mar. 15, 2000 now U.S. Pat. No. 6,661,607, which claims priority from U.S. provisional patent application 60/180,364, filed Feb. 4, 2000. Application Ser. No. 09/525,865 is also a continuation-in-part of application Ser. No. 09/503,881, filed Feb. 14, 2000 now U.S. Pat. No. 6,614,914, and application Ser. No. 09/186,962, filed Nov. 5, 1998, which is a continuation of application Ser No. 08/649,419, filed May 16, 1996, now U.S. Pat. No. 5,862,260. Application Ser. No. 08/649,419 is a continuation-in-part of application Ser. No. 08/508,083, filed Jul. 27, 1995 (now U.S. Pat. No. 5,841,978) and application Ser. No. 08/436,098 (now U.S. Pat. No. 5,636,292), filed May 8, 1995, which is a continuation in part of application Ser. No. 08/327,426, filed Oct. 21, 1994 (now U.S. Pat. No. 5,768,426), application Ser. No. 08/215,289, filed Mar. 17, 1994 (now abandoned), and application Ser. No. 08/154,866, filed Nov. 18, 1993 (now abandoned).

TECHNICAL FIELD

The invention relates to digital watermarking, and more specifically relates to applications of digital watermarks in multimedia data.

BACKGROUND AND SUMMARY

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark pattern by altering data samples of the media content in the spatial or frequency domains. The reading component analyzes target content to detect whether a watermark pattern is present. In applications where the watermark encodes information, the reader extracts this information from the detected watermark.

Recently, digital watermarks have been used in applications for encoding auxiliary data in video, audio and still images. Despite the pervasiveness of multimedia content, such applications generally focus on ways to embed and detect watermarks in a single media type.

One aspect of the invention is a method for decoding auxiliary data in multimedia content with two or more media signals of different media types. This method decodes watermarks in the media signals, uses the watermarks from the different media signals to control processing of the multimedia content. There are many applications of this method. One application is to use the watermark in one media signal to locate the watermark in another media signal. This is applicable to movies where a watermark in one media signal, such as the audio or video track, is used to locate the watermark in another media signal.

The watermark messages from different media signals may be combined for a variety of applications. One such application is to control processing of the multimedia signal. For example, the combined message can be used to control playback, copying or recording of the multimedia content.

Another aspect of the invention is a method for copy control of multimedia content where a watermark from one media signal is used to control processing of the multimedia content. An audio watermark may be used to control processing of the video signal in a movie, or a video watermark may be used to control processing of the audio signal in the movie.

Another aspect of the invention is a method for watermark decoding where a watermark decoded from a first media signal of a first media type is used to decoding a second media signal. The first and second media signals may be of the same or different types. Also, they may be part of the same composite media signal, such as an audio or video sequence. The term, "composite," refers to a collection of media signals, which may be temporal portions (e.g., time frames in audio or video), or spatial portions (e.g., blocks of pixels in an image or video frame) of a visual, audio, or audio visual work. As an example, the first media signal may be an audio or video frame (or frames) in an audio or video sequence and the second media signal may be subsequent frames in the same sequence.

This method may be used in a variety of applications. The watermark in the first media signal may be used to de-scramble, decrypt, or decompress the second media signal. In addition, the watermark in the first media signal may be used to decode a different watermark from the second signal.

Another aspect of the invention is a method that uses a watermark decoded from a first media signal of a first media type to decode metadata associated with the first media signal. The watermark may be used to locate the metadata, which may be hidden for security purposes. The metadata located from the watermark may be located on the same storage medium that includes the first media signal. For example, the metadata may be located on portable storage device, such as flash memory, a magnetic memory device (e.g., tape or disk), or an optical memory device (e.g., CD, DVD, minidisk, etc.). The metadata may be located in a file header or some other place (e.g., encoded in the disk wobble).

There are a variety of applications of the watermark in this context. It may carry a key to decrypt, decompress, descramble, or locate the metadata. The metadata, in turn, may be used to control processing of the media signal in a computer or consumer electronic device. For example, it may be used to control usage rights, playback, recording, copying, transfer, etc.

Yet another aspect of the invention is a method that decodes first and second watermarks and forms a key for decoding data from the first and second watermarks. The watermarks may be decoded from the same or different media signals. For example, the watermarks may be decoded from media signals from the same composite signal. They may be derived from different types of media signals, such as the audio and video tracks of a movie. Alternatively, they may be derived from different parts of the same type of media signal, such as an audio sequence, video sequence, or image. The watermarks may be extracted from a signal or signals stored in a storage device, such as a portable storage device (e.g., optical or magnetic disk or tape, flash memory, etc.).

The key formed from the watermarks may be used for a variety of applications. It may be used as a watermark key to decode a watermark from a media signal. It may be used as a decryption or de-scrambling key. Also, it may be used as a decompression key (e.g., a parameter used to decompress a media signal).

Further features of the invention will become apparent with reference to the following detailed description and accompanying drawings.

DETAILED DESCRIPTION

1.0 Introduction

The following sections describe applications for integrating watermarks in multimedia data. In general, these applications exploit some level of interaction between watermarks and/or metadata associated with two or more different media types. The types of media supported in a given implementation vary with the application, and may include, for example, audio (e.g., speech, music, etc.), video, images, graphical models, etc.

The initial sections describe ways to integrate watermark embedder and detector systems in multimedia data. These techniques may be applied to many different applications, including, for example, copy protection, content authentication, binding media content with external data or machine instructions, etc.

Later sections discuss specific application scenarios.

2.0 Integration of Watermarks and Metadata of Different Data Types

2.1 Defining Multimedia

The term, multimedia, as used in this document, refers to any data that has a collection of two or more different media types. One example is a movie, which has an audio and video track. Other examples include multimedia collections that are packaged together on a storage device, such as optical or magnetic storage device. For example, media signals such as still images, music, graphical models and videos may be packaged on a portable storage device such as CD, DVD, tape, or flash memory card. Different media signals may be played back concurrently, such as the video and audio tracks of a movie, or may be played independently.

2.2 Levels of Integration of Watermark Systems

The extent of integration of watermark systems for different media types ranges from a low level of integration, where watermark decoders operate independently on different media types, to a high level of integration, where the decoders functionally interact. At a low level of integration, the watermark systems for different media types operate on their respective media types independently, yet there is some relationship between the auxiliary data embedded in each type. At a high level of integration, components of the watermark detectors and readers share information and assist each other to perform their respective functions.

Figure 1:
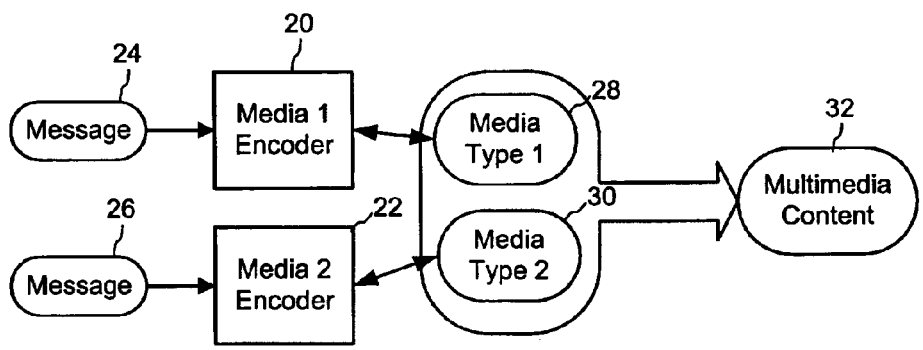
FIG. 1 is a diagram of a watermark encoder system for encoding watermarks in multimedia content.

FIG. 1 illustrates an encoder system for embedding messages into a multimedia content with two or more media types. One example of multimedia content is a movie with video and audio tracks. For the purpose of illustrating the system, the following sections use a movie as an example of multimedia content. Similar methods may be implemented for other forms of multimedia content, such as combinations of three-dimensional/two-dimensional graphics and animation, audio, video, and still images.

In the encoder system shown in FIG. 1, there is a watermark encoder 20, 22 for each media type. Each encoder may embed a message 24, 26 into the corresponding media type 28, 30 in the native domain of the signal (e.g., a spatial or temporal domain) or in some transform domain (e.g., frequency coefficients). The result is multimedia content 32 having watermarks in different media types. The multimedia content 32 may be packaged and distributed on a portable storage device, such as a CD, DVD, flash memory, or delivered electronically from one machine or device to another in a file or streaming format.

There are a variety of ways to integrate the encoder functions. One way is to use a unified key that controls how a given message or set of messages are encoded and located within the respective media types. Another way is to insert a common message component in two or more different media types. Yet another way is to make a message inserted in one media type dependent on the content of one or more other media types. For example, attributes of an image may be extracted from the image and encoded into an audio track, and similarly, attributes of an audio track may be extracted and encoded in an image. Finally, the message in one media type may be used to control the processing of another media type. For example, copy control flags in a movie's audio track may be used to control copying of the movie's video track or the movie; and, copy control flags in the video track may be used to control copying of the audio track or the movie.

The following sub-sections describe various scenarios for integrating watermarks in different media types from the perspective of the decoder.

2.2.1 Auxiliary Data Embedded in Different Media Types

Figure 2:
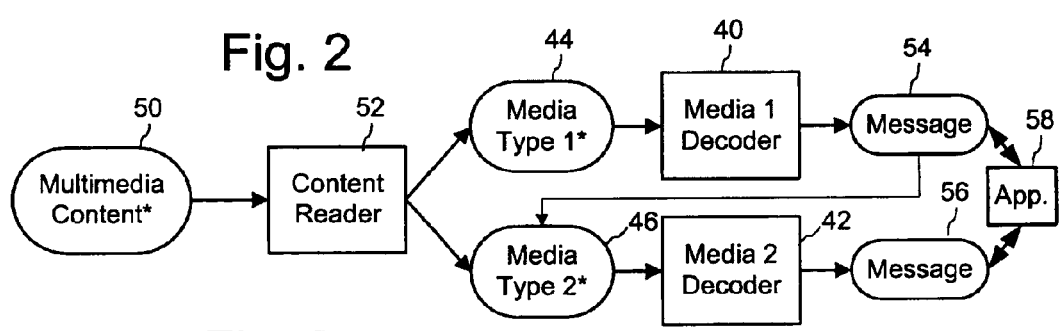
FIG. 2 is a diagram of a watermark decoder system for multimedia data.

FIG. 2 depicts a framework for low level integration, where watermark decoders 40, 42 for different media types 44, 46 operate independently, yet an application 58 uses the auxiliary data associated with each of the media types. The auxiliary data may be encoded in a watermark message within a media signal or may be located in metadata accompanying the media signal (e.g., on the storage device and/or within a header of a file or data packet encapsulating the media). The multimedia content 50 is annotated with a "*" to reflect that it may not be identical to the original version of the content (e.g., the content shown at item 32, FIG. 1) at the time of encoding due to intentional or unintentional corruption (e.g., filtering, compression, geometric or temporal transforms, analog to digital, and digital to analog conversion). A content reader 52 receives the multimedia data and identifies the distinct media types within it. The functionality of the content reader may be built into a watermark decoder or provided by a separate computer program or device. In the example of a movie, the content reader identifies the audio and video tracks.

Watermark decoders for each media type operate on their respective media data. In extracting the watermark from the signal domain in which the embedder inserted it, the decoder functions compliment the embedder functions. In many applications, the media types may be coded in a standard or proprietary format. In the example of a movie, both the audio and video tracks are typically compressed (e.g., using some lossy transform domain compression codec like MPEG). The watermark decoders may operate on compressed, partially compressed or uncompressed data. For example, the decoders may operate on frequency coefficients in the compressed image, video or audio data. As shown in FIG. 2, the decoders 40, 42 operate independently on corresponding media types to extract messages 54, 56 from watermarks in each media type.

In the low level integration scenario of FIG. 2, an application 58 uses the messages from different media types to process the multimedia content. The application is a device, software process, or combination of a device and software. The specific nature of this processing depends on the requirements of a particular application. In some cases, the message embedded in one media type references content of another type (e.g., link 60 from message 54 to media type 2). For example, text sub-titles in a movie may be embedded in the audio track, and may be linked to specific frames of video in the video track via frame identifiers, such as frame numbers or addresses. The application, in this scenario, controls the playback by superimposing the text sub-titles on the linked frames.

In many applications, it may be useful to insert a link in one media type to content of another media type within the multimedia data. For example, one might want to link a still image or a video texture to a graphical model. Then, a graphics rendering application may use the link to determine which image (or video) to map to the surface of a graphical model. As another example, one might link an audio clip to an image, graphical model or other media object. When instructed to render the image, model or other media object, the rendering application then uses the link to also initiate playback of the linked audio clip, and optionally, to synchronize playback of the linking media signal with the signal linked by the watermark. For example, the video watermark could specify which audio clip to play and when to initiate playback of parts of the audio clip. Stated more generally, the embedded link from one media type to another may be used by the rendering application to control the relationship between the linked media objects during playback and to control the playback process.

The media signals within multimedia content can be linked together through watermarks and embedded with control information and metadata that is used to control playback. The entire script for controlling playback of a multimedia file or collection may be embedded in watermarks in the media signals. For example, a user could initiate playback by clicking on an image from the multimedia content. In response, the rendering application extracts control instructions, links, and/or metadata to determine how to playback video, audio, animation and other media signals in the multimedia content. The rendering application can execute a script embedded in a watermark or linked via a reference in the watermark (e.g., a watermark message includes a pointer to, or an index or address of a script program stored elsewhere). The watermark message may also specify the order of playback, either by including a script, or linking to a script that contains this ordering. Several media signals may be tied together in a playback sequence via a linked list structure where watermarks embedded in the media signals reference the next media signal to be played back (as well as media signals to be played back concurrently). Each media signal may link to another one by providing a media signal identifier in the watermark message, such as an address, pointer, index, name of media title, etc.

As the rendering application plays back multimedia content, it can also display metadata about the media signals (e.g., the content owner, a description of the content, time and location of creation, etc.). The watermark messages embedded in the media signals can either include this metadata or link to it. In addition, the watermark messages may include instructions (or a link to instructions) for indicating how and when to display metadata. The metadata need not be in text form. For example, metadata may be in the form of speech output (via a text to speech synthesis system), a pre-recorded audio clip, video clip, or animation.

To embed a variety of different information, instructions and links into the media signals within multimedia content, the embedder can locate watermark messages in different temporal portions (e.g., time multiplex different messages) of a time varying signal like audio or video. Similarly, the embedder can locate different watermark messages in different spatial portions of images, graphical models, or video frames. Finally, the embedder can locate different watermark messages in different transform domains (e.g., Discrete Fourier Transform, Discrete Cosine Transform, Wavelet transform, etc.) of image or audio signals.

The following sub-sections describe additional application scenarios.

2.2.1.1 Copy Protection

In a copy protection application, the messages embedded in each media type convey information to the application specifying how it may use the content. For example, each message may provide copy control flags specifying "copy once", "copy no more", "copy freely", and "copy never." These flags indicate whether the application may copy the media type or the multimedia content as a whole, and if so, how many times it may copy the pertinent content.

The application collects the copy control flags from the different media types and determines the extent to which it may copy the content or selected media types within it.

2.2.1.2 Ownership Management

In multimedia content, each media type may be owned by different entities. The messages embedded in the content may contain an owner identifier or link to an owner. An ownership management application can then collect the ownership information, either from each of the messages in each media type, or by requesting this information by following the link to the owner. For example, the link may be associated with an external database that provides this information. The application may use the link to query a local database for the information. Alternatively, the application may use the link to query a remote database via a wire, wireless, or combination of wire and wireless connections to a remote database on a communication network (e.g., the Internet). One or more intermediate processing stages may be invoked to convert the link into a query to the remote database. For example, the link may be a unique number, index or address that cross-references the URL of a database server on the Internet.

2.2.1.3 Media Authentication

An authentication application may use watermark messages and/or metadata to authenticate media signals within the multimedia content. One or more of the media signals in multimedia content may be tampered with. Multimedia content poses an additional problem because media signals may be swapped into the content in place of the original signals. For example, in a video used as evidence, one might swap in a fake audio clip or remove a portion of the audio track. One way to authenticate the media signals is to extract features from them, hash the features, and insert the hashed features into the watermark messages of one or more of the media signals at encoding time.

To verify authenticity, the application at the decoder side repeats the process of extracting the features from the received media types (e.g., 44, 46), hashing these features, and then comparing the new hash with the hash extracted from the watermark message or messages. The objective of the hash is to create a content dependent parameter that may be inserted into a watermark message, or in some cases, in metadata associated with a media signal. The hash is not necessary if the size of the extracted features is such that they fit within a message.

Examples of features in images include the location of identifiable objects (such as the location of eyes and noses of human subjects), the shape of objects (e.g., a binary mask or chain code of an object in an image), the inertia of an image, a low pass filtering of an image, the Most Significant Bit of every pixel in a selected color plane (luminance, chrominance, Red, Green, Blue, etc.).

Examples of features in audio include the temporal location of certain aural attributes (e.g., a transition from quiet to high intensity, sharp transitions in spectral energy, etc.), a low pass filter of an audio clip, etc.

Features from one media type may be inserted into a watermark or the metadata of another media type. Alternatively, they may be combined and inserted in one or more of the media types in a watermark embedded in a watermark of the media signal or its metadata.

An additional level of security may be added using public key encryption techniques to create a digital signature that identifies the source of the multimedia content. Some examples of public key cryptography include RSA, DES, IDEA (International Data Encryption Algorithm), skipjack, discrete log systems (e.g., El Gamal Cipher), elliptic curve systems, cellular automata, etc. Public key cryptography systems employ a private and public key. The private key is kept secret, and the public key is distributed to users. To digitally sign a message, the originator of the message encrypts the message with his private key. The private key is uniquely associated with the originator. Those users having a public key verify that the message has originated from the holder of the private key by using the public key to decrypt the message.

2.2.2 Integrating Watermark Detection Processes

Another way to integrate processing of media types is to integrate watermark detectors for different media types. One function of some watermark detectors is to determine the orientation and strength of a watermark within a host media signal. The orientation may provide the watermark location, and possibly other orientation parameters like warp (e.g., an affine or non-linear warp, temporal and/or spatial), scale, rotation, shear, etc. As the media content is subjected to various transformations, the watermark orientation and strength may change. Watermark detectors use attributes of the watermark signal to identify its location and orientation within a host signal. In multimedia content where different media signals are watermarked, detectors for the respective media signals can assist each other by sharing information about the orientation and/or strength of a watermark in the media signals. While the watermarks in different media types may be transformed in different ways, the orientation information found in one media signal might help locate a watermark in a different media signal.

Figure 3:
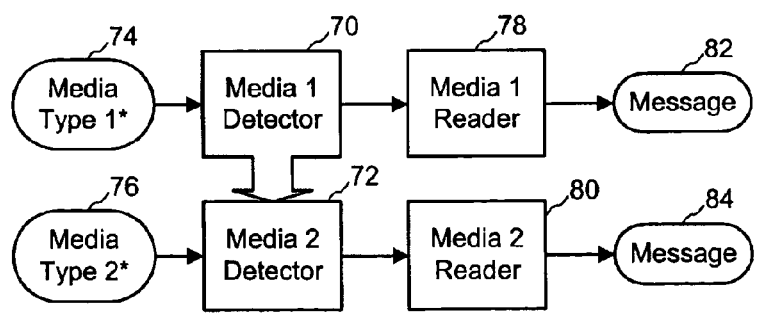
FIG. 3 is a diagram of a watermark decoder system where watermark detectors for different media types collaborate.

FIG. 3 depicts a watermark decoder framework in which the watermark detectors for different media types collaborate. Each detector 70, 72 operates on its respective media type 74, 76, yet the detectors share information. The detectors determine the presence, and in some cases, the strength and/or orientation of a watermark in a host media signal. In some applications, such as authentication, the detector identifies portions of the media signal that have a valid watermark signal, and portions where the watermark has been degraded (e.g., the watermark is no longer detectable, or its strength is reduced). Depending on the nature of the host signal, these portions may be temporal portions (e.g., a time segment within an audio signal where the watermark is missing or degraded) or spatial portions (e.g., groups of pixels in an image where the watermark is missing or degraded). The absence of a watermark signal, or a degraded watermark signal, may evidence that the host signal has been tampered with.

In applications where the watermark carries a message, each detector may invoke a watermark reader 78, 80 to extract a message from the watermark. In some cases, the reader uses the orientation to locate and read the watermark. The strength of the watermark signal may also be used to give signal samples more or less weight in message decoding. Preferably, each reader should be able to read a watermark message 82, 84 from a media signal without requiring the original, un-watermarked media signal.

One example of integrated detection is a scheme where watermark detectors operate on respective media types concurrently and share orientation parameters. To illustrate the scheme, consider the example of a movie that has a watermarked audio and video track. While video and audio are distinct media signals in the content delivery and storage formats, the video and audio tracks are carefully synchronized so that the audio closely tracks the movement of actors' mouths and other motion depicted in the video. The embedding scheme places audio watermarks within a specified temporal range of the video watermarks. Because the video and audio tracks need to be temporally synchronized to avoid noticeable artifacts during playback, the temporal locations of the audio and video watermarks are likely to remain within a predictable temporal distance in their respective host signals. As such, the watermark detectors can take advantage of the temporal relationship of the watermarks in different media types to facilitate detection.

The location of a watermark detected in one media signal can provide information about the location of a watermark yet to be detected in another media signal. For example, when the video watermark detector finds a watermark in a video frame (e.g., an I frame in MPEG video), it signals the other detector, passing information about the temporal location of the video watermark. Leveraging the temporal relationship between the video and audio watermarks, the audio watermark detector confines its search for an audio watermark to a specified temporal range in the audio signal relative to the location of the corresponding video watermark in the video signal.

In this scenario, the audio watermark detector may provide similar information to the video watermark detector to help it identify the frame or sequence of frames to be analyzed for a video watermark.

Another example is a scheme where one watermark detector operates on a media type, and then passes orientation parameters to a detector of another media type. This scheme reduces the complexity of the second detector because it uses the orientation parameters extracted from a first media type to assist computation of the orientation in another media type. Applying this scheme to the previous example of a movie, the watermark decoder method reduces the complexity of the audio detector by confining its search to a specified range defined relative to the location of a video watermark. This is a simpler case than the previous example in the sense that the orientation information flows solely from a first detector to a second one. The second detector searches in a confined space around the location specified by the other detector, and does not have to pass orientation information to the other detector.

2.2.3.1 Applications of Integrated Watermark Detectors

As in the previous sections, there are a variety of applications for watermark systems with integrated detectors. The watermarks may be used to encode data or links to external data or other media signals within the multimedia content.

The watermarks may also be used to encode authentication information. In the movie example, the watermarks in one media type can reference one or more watermarks in another media type. For example, if an audio detector does not find an audio watermark designated by the video watermark to be in a specified range within the audio signal, then it can mark that specified range as being corrupted. Similarly, the video detector can authenticate video frames based on presence or absence of video watermarks designated by audio watermarks.

In copy control applications for mixed media like movies, integrated detectors can be used to locate audio and video watermarks carrying copy control flags. If the audio or the video tracks have been tampered with or transformed in a way that removes or degrades the watermarks, then a copy control application can take the appropriate action in response to detecting the absence of a watermark or a degraded watermark. The actions triggered in response may include, for example, preventing copying, recording, playback, etc.

2.2.4 Integrating Watermark Message Reading of Different Media Types

Figure 4:
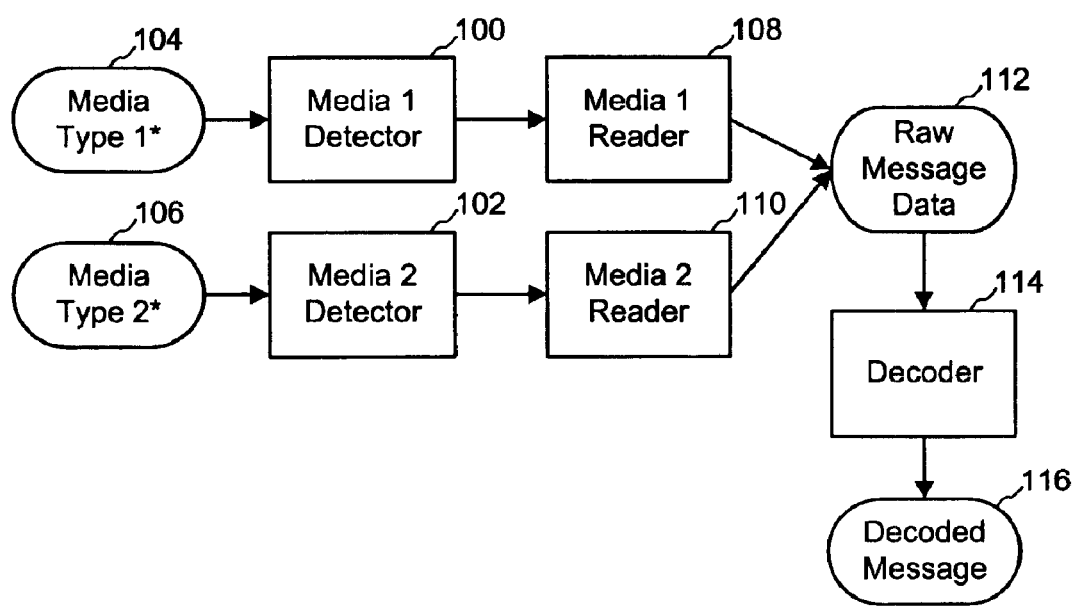
FIG. 4 is a diagram of a watermark decoder system where watermark readers for different media types collaborate.

FIG. 4 illustrates yet another scenario for integrating watermark decoders where the watermark readers for different media types collaborate. In this scheme, watermark detectors 100, 102 for different media types 104, 106 operate independently (or collaborate as described above) to detect the presence, and optionally the orientation, of watermarks in their respective media types. Watermark readers 108, 110 then extract messages from the detected watermarks. The watermark readers pool the message data 112 that they extract from the different media types.

Then, a message decoder 114 attempts to decode the pooled message data. The message decoder may perform various error correction decoding operations, such as Reed Solomon, BCH, Turbo, Convolution operations. In cases where the watermark embedder uses spread spectrum modulation to spread raw message bits in the host media signal into chips, the message decoder may perform the inverse of a spread spectrum modulation function to convert spread spectrum chip values back to raw message values.

The result of the decoding operations provides information about the media signals. Depending on the application and implementation, the decoded message 116 can be interpreted in different ways. For example, in some cases, to generate a valid decoded message (as indicated by an error detection process such as a CRC or parity check), watermark message data from each media signal must be valid. In other cases, the decoded message may specify which media signals have valid messages, and which do not.

2.2.4.1 Applications

Like the other scenarios described above, the scheme for integrating watermark readers of different media types can be applied to many applications, including data embedding and linking, content authentication, broadcast monitoring, copy control, etc. This scheme is particularly suited for content authentication and copy control because it can be used to indicate content tampering and to disable various operations, such as copying, playback, recording, etc. For example, it can be used in a copy control scheme for content with audio and video tracks. Each track contains watermark messages that must be detected and converted to the raw message data 112 before the decoder 114 can decode a valid message. Thus, valid copy control information in both the video and audio tracks must be present before a valid copy control message 116 will be produced. A player can then process the multimedia content based on the control information in the valid copy control message. Alternatively, the content can be prevented from being passed into a player or other application or device if a valid control message is not generated.

2.2.5 Using Watermark Messages to Store Keys to other Watermarks or Metadata The watermark message in one media signal may be used to specify a key of a watermark in another media signal. In this scenario, the watermark reader for one media type supplies the watermark decoder for another media type with the key. This key may specify the location of the watermark as well as information about how to extract the watermark from another media signal, and information to decode or decrypt the watermark message.

The watermark message in a media signal may also specify a key to access other metadata on the storage device of the media signal. For example, the message may specify a key to decrypt or decode metadata on the storage device, such as metadata in a header file or encoded within tracks of a CD or DVD (e.g., encoded within the disk wobble). The key may also specify the location of the associated metadata.

2.2.5.1 Applications

The scheme described in the previous section may be used in many applications, including those discussed previously. This scheme is particularly suited for content authentication and copy protection. In order to authenticate the content, each of the media signals in multimedia content need to have valid watermarks. The watermark in one media signal cannot be located without extracting a key from a watermark in another media signal.

In copy protection applications, the decoding system would need to find the watermarks in each of the media signals before enabling certain actions (e.g., playback, recording, copying, etc.).

2.3 Using Watermark Data in One Media Type to Control Playback of Another Media Type For some applications, it is not necessary that each media signal in multimedia content have a watermark. For example, a watermark in one media signal could provide the desired functionality for the entire content, or for selected portions of the content. For example, in copy protection applications for movies, a watermark in the audio track could be used to encode copy control flags to control copying, playback, or recording of audio and/or video tracks.

2.4 Using Watermark Data in Conjunction with other Data or Applications

The watermark message data can be used in conjunction with other data or applications to control processing of the multimedia or single media content. Using any of the scenarios above, for example, a decoder can extract a message that is used to control further media processing.

One example is where the watermark message is used as a necessary key for decoding or decrypting the media content. For example, the watermark message may contain necessary bits for decompressing (e.g., MPEG decoding) of the media signal or signals within the content (audio, video or both). Examples of necessary bits are CRC bits that are required to reconstruct coded video or audio data. This technique is particularly useful when the message is derived from watermark messages embedded in different media signals. In a movie copy control application, for instance, the decoder would have to generate a valid message based on decoding the raw message information from audio and video watermark messages before allowing playback, recording, etc. In this case, the embedder would spread the necessary control information into watermark messages inserted in the audio and video tracks. For example, watermark messages in audio or video frames include decompression parameters or descrambling keys to decompress or descramble subsequent audio or video frames.

The same approach can be implemented by embedding other forms of control data in one or more watermark messages in different media signals. Another example is a decryption key that is necessary to decrypt other media signals within the content, or other portions of the same media signal. Watermark messages in audio or video frames may include decryption keys to decrypt subsequent frames. One watermark message may include a key, or a portion of a key, needed to decrypt or unscramble other signal portions or other watermark messages. In the case where the watermark message includes only a portion of a key (e.g., one parameter in a key comprising two or more parameters), the other portion may be constructed by extracting another component of the key from another watermark message (in the same or different media signals) or from other metadata (e.g., in the disk wobble, the header file of MPEG content, etc.).

Another form of control data is region data that indicates that a particular media signal may only be played when the region data of the media signal and the player match. A similar region data scheme is understood to be implemented in the Content Scrambling System currently used for DVDs. The region data can be embedded in one or more watermarks in the same or different media signals. By placing this information in different media signals, the decoder must be able to extract consistent region data from watermarks in each of the media signals as a pre-requisite to further use of the content. Then, assuming all of the region data creates a valid region data message, then the copy control application would control playback based on whether the region data decoded from the watermarks (and/or metadata of the different media signals) matches the region data of the player.

3.0 Implementation of Watermark Encoders and Decoders

The state of watermark encoders and decoders for audio, video and still images is quite advanced. Some examples of watermark systems for multimedia data include U.S. Pat. Nos. 5,862,260, 5,930,369, and U.S. patent application Ser. No. 09/503,881. Examples of watermark systems targeted to audio signals include U.S. Pat. Nos. 5,945,932, 5,940,135, 6,005,501, and 5,828,325. Other watermark systems are described in U.S. Pat. Nos. 5,940,429, 5,613,004, 5,889,868, WO 99/45707, WO 99/45706, WO 99/45705, and WO 98/54897.

Examples of watermark systems used in copy control are: WO 00/04688, WO 00/04712, WO 00/04727, and WO 99/65240. These documents include examples where a copy protection scheme uses watermark data and metadata to control processing of a media signal.

Watermark systems that operate on compressed content include: U.S. Pat. No. 5,687,191; and WO 00/04722.

These watermark systems may be used to implement the scenarios described above.

3.1 Location of the Watermark Decoder

The watermark decoder may be implemented in one or more components. The location of these components varies depending on the application. For multimedia content on portable memory devices like DVDs or CDs, the decoder may be implemented in the drive hardware or in an interface to the drive hardware. Alternatively, the decoder may be located in an application program or device. One example is a media codec, like an MPEG decoder. If the media signals are compressed, the detector may have to implement at least portions of the codec. For example, if the watermark is coded in frequency coefficients in MPEG video and audio, the decoder system may include an MPEG parser and dequantizer to identify the media signals (audio and video signals) and extract the coefficients from each of the media signals. Placing the watermark decoder in the media codec, such as the MPEG codec, saves resources because many of the resources used for decoding the media signals may also be used for detecting and reading the watermarks.

3.2 Operating Environment

Figure 5:
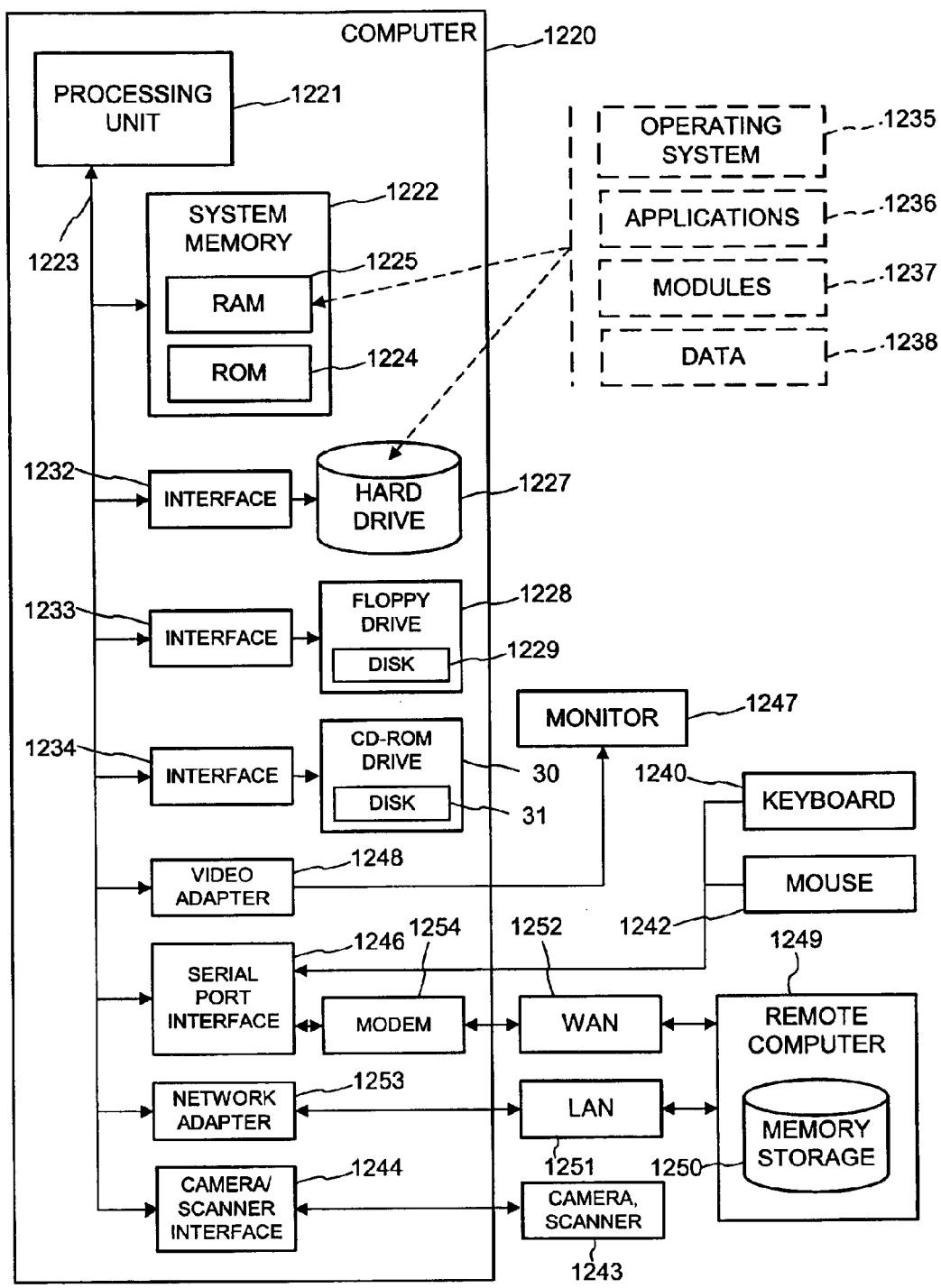
FIG. 5 illustrates an operating environment for implementations of the invention.

FIG. 5 illustrates an example of a computer system that may serve as an operating environment for software implementations of the watermarking systems described above. The encoder and decoder implementations as well as related media codecs and applications may be implemented in C/C++ and are portable to many different computer systems. Components may also be implemented in hardware devices or in a combination of hardware and software components. These components may be installed in a computing device such as a Personal Digital Assistant, Personal Computer, Hand-held media player, media players (DVD players, CD players, etc.) or implemented in a hardware module such as an integrated circuit module, ASIC, etc. FIG. 5 generally depicts one example of an operating environment for encoder and decoder systems.

The computer system shown in FIG. 5 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the personal computer 1220 through a keyboard 1240 and pointing device, such as a mouse 1242. Other input devices may include a microphone, sound card, radio or television tuner, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

In addition to a camera or scanner, watermarked images or video may be provided from other sources, such as a packaged media devices (e.g., CD, DVD, flash memory, etc), streaming media from a network connection, television tuner, etc. Similarly, watermarked audio may be provided from packaged devices, streaming media, radio tuner, etc.

These and other input devices are often connected to the processing unit 1221 through a port interface 1246 that is coupled to the system bus, either directly or indirectly. Examples of such interfaces include a serial port, parallel port, game port or universal serial bus (USB).

A monitor 1247 or other type of display device is also connected to the system bus 1223 via an interface, such as a video adapter 1248. In addition to the monitor, personal computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 5. The logical connections depicted in FIG. 5 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the personal computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the personal computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

4.0 Relationship with other Applications of Metadata

Watermarks can facilitate and cooperate with other applications that employ metadata of multimedia objects. As demonstrated above, this is particularly true in copy protection/control applications where the copy control information in the watermark and the metadata are used to control playback. The watermark message and metadata (in the MPEG file header or encoded in the disk wobble) can form components in a unified key that is a necessary prerequisite to playback or some other use of the content.

The watermarks in the media signals can each act as persistent links to metadata stored elsewhere, such as a metadata database server on the Internet or some other wire or wireless network. Applications for viewing and playing content can display metadata by extracting the link and querying a metadata database server to return the metadata (e.g., owner name, content description, sound or video annotation, etc.). The watermark decoder or an application program in communication with it can issue the query over the Internet using standard communication protocols like TCP/IP, database standards like ODBC, and metadata standards like XML. The query may be sent to a metadata router that maps the link to a metadata database server, which in turn, returns the metadata to the viewing application for display or playback to the user.

5.0 Concluding Remarks

The watermarking technology detailed herein can be employed in numerous diverse applications. See, e.g., the applications for watermarking detailed in commonly-owned U.S. Pat. No. 5,862,260, and copending application Ser. Nos. 09/292,569, 60/134,782, 09/343,104, 09/473,396, 09/476,686, and 60/141,763.

Having described and illustrated the principles of the invention with reference to several specific embodiments, it will be recognized that the principles thereof can be implemented in other, different, forms.

To provide a comprehensive disclosure without unduly lengthening the specification, applicant incorporates by reference any patents and patent applications referenced above.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles of the invention can be applied, it should be recognized that the detailed embodiment is illustrative only and should not be taken as limiting the scope of the invention. Rather, we claim as our invention all such embodiments as may come within the scope and spirit of the following claims, and equivalents thereto.

What is claimed is:

1. A method for decoding auxiliary data in audio visual content with an audio and video track, comprising:

decoding digital watermarks in the audio and video tracks;

combining watermark messages from the audio and video tracks; and using the combined messages to control processing of the audio visual content.

2. The method of claim 1 wherein the combined messages are used to control playback, copying or recording of the audio visual content.

3. A tangible medium on which is stored instructions for performing the method of claim 1.

4. A method for digital watermark decoding for audio visual content including an audio and video track, the method comprising:

decoding a first watermark from a first track of the audio visual content, the first track being the audio or video track;

and decoding a second media signal from a second track using the digital watermark from the first track, the second track being the audio or video track not including the first watermark.

5. The method of claim 4 wherein decoding the second media signal comprises decompressing the second media signal using the first watermark.

6. The method of claim 4 wherein the decoding comprises de-scrambling or decrypting the second media signal using the first watermark.

7. The method of claim 4 wherein the decoding comprises using information from the first watermark as a watermark key for decoding a different watermark from the second media signal.

8. The method of claim 7 wherein the watermark key specifies a location of the different watermark in the second media signal.

9. A tangible medium on which is stored instructions for performing the method of claim 4.

10. A method of digital watermark decoding from audio visual content having an audio and video track, the method comprising:

decoding at least a first watermark from a first media signal in the audio visual content;

decoding at least a second watermark from a second media signal in the audio visual content; and forming a key for decoding data from at least the first and second watermarks.

11. The method of claim 10 wherein the first and second media signals are of the same media type.

12. The method of claim 10 wherein the first and second media signals are of different media types.

13. The method of claim 10 wherein the key comprises a watermark key used to decode a watermark from a media signal.

14. The method of claim 10 wherein the key comprises a decryption key used to decrypt a media signal.

15. The method of claim 10 wherein the key comprises a parameter used to decompress a media signal.

16. A tangible medium on which is stored instructions for performing the method of claim 10.

* * * * *

UNITED STATES PATENT AND TRADEMARK OFFICE
CERTIFICATE OF CORRECTION

| | | |
|---|---|---|
| PATENT NO. | : 6,975,746 B2 | Page 1 of 1 |
| APPLICATION NO. | : 10/648105 | |
| DATED | : December 13, 2005 | |
| INVENTOR(S) | : Tony F. Rodriguez, Bruce L. Davis and Geoffrey B. Rhoads | |

It is certified that error appears in the above-identified patent and that said Letters Patent is hereby corrected as shown below:

Title Page

Under "Related U.S. Application Data", Item 63, please delete lines 1-16 and replace with the following:

Related U.S. Application Data

(63)   Continuation of application No. 09/525,865, filed Mar. 15, 2000 now Pat. No. 6,611,607, which is a continuation-in-part of application No. 09/503,881, filed on Feb. 14, 2000, now Pat. No. 6,614,914, and a continuation-in-part of application No. 09/186,962, filed on Nov. 5, 1998, which is a continuation of application No. 08/649,419, filed on May 16, 1996, now Pat. No. 5,862,260, which is a continuation-in-part of application No. 08/508,083, filed on Jul. 27, 1995, now Pat. No. 5,841,978, and a continuation-in-part of application No. 08/436,098, filed on May 8, 1995, now Pat. No. 5,636,292, which is a continuation-in-part of application No. 08/327,426, filed on Oct. 21, 1994, now Pat. No. 5,768,426, and a continuation-in-part of application No. 08/215,289, filed on Mar. 17, 1994, now abandoned, and a continuation-in-part of application No. 08/154,866, filed on Nov. 18, 1993, now abandoned.

Signed and Sealed this

Seventeenth Day of May, 2011

David J. Kappos
*Director of the United States Patent and Trademark Office*